C. LE G. FORTESCUE.
MEANS FOR ELIMINATING HARMONICS IN POLYPHASE ALTERNATORS.
APPLICATION FILED JAN. 29, 1917. RENEWED FEB. 26, 1921.
1,376,425.
Patented May 3, 1921.
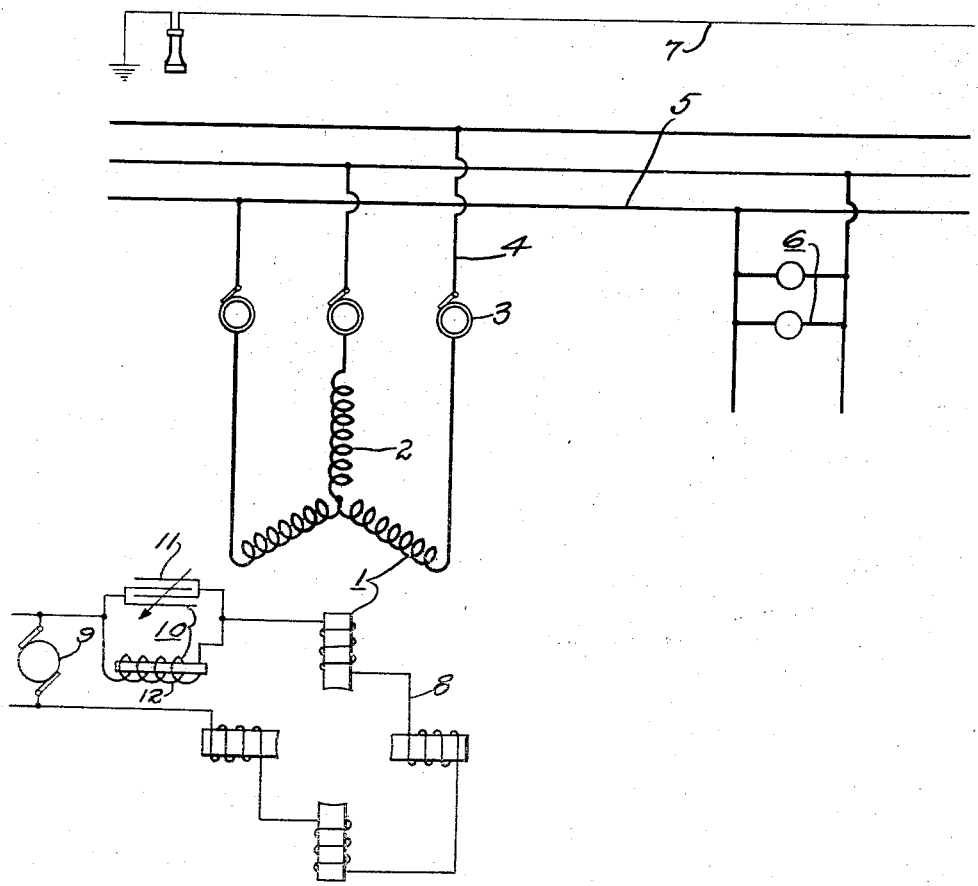
WITNESSES:
INVENTOR
Charles Le G. Fortescue
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

MEANS FOR ELIMINATING HARMONICS IN POLYPHASE ALTERNATORS.

1,376,425.   Specification of Letters Patent.   Patented May 3, 1921.

Application filed January 29, 1917, Serial No. 145,232. Renewed February 26, 1921. Serial No. 448,076.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Means for Eliminating Harmonics in Polyphase Alternators, of which the following is a specification.

My invention relates to alternating-current polyphase distributing systems, and it has special relation to means for preventing the flow therein of harmonic current impulses that are developed in the polyphase dynamo-electric machines connected to the systems by reason of unbalanced polyphase currents obtaining in the several phase windings of such machines.

In a distributing system, it is desirable, for many reasons, to prevent high-frequency alternating-current impulses from flowing therein. It is especially desirable to prevent such harmonic currents from flowing when an intelligence-transmission circuit, such as a telephone or telegraph circuit, is disposed adjacent to a distributing system. In this instance, the high-frequency impulses or harmonic currents traversing the distributing system may induce inductive disturbances in the adjacent intelligence-transmission circuit that will seriously interfere with its proper operation.

Harmonic-current impulses may be generated in a polyphase distributing system as a consequence of unbalanced currents traversing the several polyphase mains when unbalanced-load conditions obtain in the system. The production of these harmonic impulses may be explained by reason of the fact that the unbalanced currents flowing in the several phases of a polyphase generator connected to the mains are responsible for the projection of harmonic impulses upon the distributing mains because of the resulting distortion of the magnetic fields in the generator to which the armature winding is subjected.

Any unbalanced three-phase electromotive forces or currents, which may be represented by a system of vectors of different magnitudes but capable of forming a closed polygon, may be resolved into two component systems of balanced vectors. One of the component systems of balanced vectors has the same phase rotation as that of the resultant system of unbalanced vectors, and the other component system of balanced vectors has a phase rotation opposite to that of the said resultant system. Therefore, when unbalanced currents obtain in a three-phase distributing system, unbalanced currents will likewise flow in the several phases of the armature winding of the connected alternator. The counter-phase rotational magnetomotive forces, generated by reason of the aforementioned counter-phase rotational balanced system of currents, induce double-frequency single-phase current in the field winding of the alternator. The magnetic flux pulsations resulting from the flow of these currents induced in the field winding are the equivalent of two equal and balanced polyphase systems of magnetomotive forces, one of which reacts to reduce the main magnetomotive force while the other is instrumental in inducing currents in the armature windings of the alternator.

In a three-phase system, the last mentioned system of rotating magnetomotive forces rotates, at double-synchronous speed, in a direction opposite to that of the main field relative to the armature windings. In consequence thereof, this double-frequency system of magnetomotive forces induces triple-frequency, balanced, three-phase currents in the armature winding of the alternator which have the same phase rotation as the load currents obtaining therein. These triple-frequency currents, in turn, react on the field winding of the alternator to generate therein a quadruple-frequency current, which, in turn, reacts on the armature winding of the alternator to produce three-phase, balanced, quintuple-frequency currents in the manner described above with reference to the original double-frequency current induced in the field winding. The result of the unbalanced currents obtaining in the armature winding of the alternator is, therefore, the production of a train of three-phase odd harmonics of the same phase rotation as the fundamental and of diminishing amplitude that is imposed upon the fundamental voltage sine-waves generated in the armature winding. Some of these odd harmonic impulses; namely, those that are multiples of three, produce unequal wave-forms in the three phases of the armature winding because these odd harmonics are in three-phase relation in the three-phase system.

It is, therefore, evident that, if the aforesaid double-frequency current initially induced in the field winding of the alternator by the unbalanced currents in the armature winding is prevented from flowing, the train of harmonic impulses will be completely eliminated. The object of my invention, therefore, is to provide means whereby these unbalanced polyphase currents in the armature winding of an alternator may be prevented from reacting in such a manner as to produce undesirable harmonic impulses that will distort the fundamental wave-forms developed in the armature winding.

For a better understanding of the nature of my invention, reference may be had to the following description and the accompanying drawing in which the single figure is a diagrammatic representation of a distributing system comprising a three-phase alternator that is built in accordance with my invention.

Referring to the drawing, a three-phase alternator 1, having a Y-connected armature winding 2, is connected, by means of slip rings 3 and leads 4, to polyphase distributing mains 5. A load circuit 6 is connected across one of the phases of the distributing system and, in consequence thereof, unbalanced polyphase currents traverse the mains 5. The unbalanced currents may be instrumental in producing harmonic currents which will seriously interfere with the proper operation of an adjacent telephone circuit 7. It is, therefore, desirable to prevent the unbalancing currents obtaining in the mains 5 from so reacting upon the alternator 1 that undesirable harmonic impulses will be projected by the alternator upon the distributing system.

The alternator is provided with a field winding 8 that is excited by means of a direct-current generator 9. A parallel-resonant circuit 10, comprising a condensive element 11 and an inductive element 12 connected in parallel relationship with each other, is connected in series circuit with the field winding 8. The electrical constants of the elements 11 and 12 are so adjusted that they form a parallel-resonant circuit for alternating currents of double-synchronous frequency. In other words, alternating currents having twice the frequency of the load currents obtaining in the armature winding 2 are substantially precluded from flowing in the circuit comprising the field winding 8.

As mentioned above, the field winding 8 is subjected to counter-phase rotational magnetomotive forces when unbalanced polyphase currents traverse the armature winding 2. These counter-phase rotational magnetomotive forces will tend to induce a double-frequency alternating current in the field winding 8 which will react on the armature winding 2 in such a manner as to set up a train of harmonics therein that may be detrimental. Since the parallel-resonant circuit 10 substantially precludes this induced double-frequency current from flowing in the field winding 8, the possibility of a train of harmonic impulses being developed in the armature winding 2 is eliminated and, consequently, the voltage wave-forms obtaining in the several phases of the armature winding 2 will not be distorted.

While I have shown and described a single device only for eliminating the detrimental action of unbalanced polyphase currents upon the voltage wave-forms of an alternator, it will be understood that many modifications may be made therein without departing from the spirit and scope of the appended claims.

I claim as my invention:

1. A polyphase alternating-current dynamo-electric machine comprising an armature winding through which polyphase currents may flow, a field winding, and a parallel-resonant circuit tuned to the proper frequency and connected in series with the field winding in order to substantially prevent harmonic impulses from being generated in the armature winding when unbalanced polyphase currents obtain therein.

2. A polyphase alternating-current dynamo-electric machine comprising an armature winding through which polyphase currents may traverse, a field winding, and a tuned resonant circuit connected in series with said field winding for substantially precluding the flow therethrough of an alternating current having twice the frequency of the armature currents.

3. The combination with a polyphase dynamo-electric machine embodying armature and field windings, of a distributing system connected thereto and embodying differing impedances in certain of its phase divisions, whereby unbalanced polyphase currents tend to flow in said armature winding, and impedance means establishing parallel resonance connected in the field circuits of said machine, said means being tuned for substantially twice the fundamental frequency of said machine.

4. The combination of an alternating-current dynamo-electric machine embodying armature and field windings, of a distributing system connected thereto and carrying a single-phase component-current, and impedance means establishing parallel resonance connected in the field circuits of said machine, said means being tuned for substantially twice the fundamental frequency of said machine.

In testimony whereof I have hereunto subscribed my name this 19th day of January, 1917.

CHARLES LE G. FORTESCUE.